(12) United States Patent
Zou et al.

(10) Patent No.: US 9,856,432 B2
(45) Date of Patent: Jan. 2, 2018

(54) HIGHLY DURABLE AND WELL-ADHERED GRAPHITE COATING

(71) Applicants: Min Zou, Fayetteville, AR (US); Jiyu Cai, Fayetteville, AR (US)

(72) Inventors: Min Zou, Fayetteville, AR (US); Jiyu Cai, Fayetteville, AR (US)

( * ) Notice: Subject to any disclaimer, the term of this patent is extended or adjusted under 35 U.S.C. 154(b) by 307 days.

(21) Appl. No.: 14/714,261

(22) Filed: May 16, 2015

(65) Prior Publication Data
US 2016/0333287 A1  Nov. 17, 2016

(51) Int. Cl.
| | | |
|---|---|---|
| *B32B 15/01* | (2006.01) | |
| *C10M 103/02* | (2006.01) | |
| *B05D 1/18* | (2006.01) | |
| *B05D 5/08* | (2006.01) | |
| *B05D 3/02* | (2006.01) | |
| *C10M 103/06* | (2006.01) | |
| *C10M 177/00* | (2006.01) | |
| *C10M 111/04* | (2006.01) | |

(52) U.S. Cl.
CPC .............. *C10M 103/02* (2013.01); *B05D 1/18* (2013.01); *B05D 3/0254* (2013.01); *B05D 5/08* (2013.01); *C10M 103/06* (2013.01); *C10M 111/04* (2013.01); *C10M 177/00* (2013.01); *B32B 15/01* (2013.01); *C10M 2201/0413* (2013.01); *C10M 2201/0653* (2013.01); *C10M 2201/0663* (2013.01); *C10M 2217/0285* (2013.01); *C10N 2230/06* (2013.01); *C10N 2250/14* (2013.01); *C10N 2280/00* (2013.01)

(58) Field of Classification Search
CPC ........ C08G 61/00; C10M 103/02; B05D 3/10; B05D 3/101; B05D 3/102; B05D 5/08; B05D 5/10; B05D 2202/15; B32B 15/011; B32B 15/01; B32B 9/007; B32B 5/18; B32B 2379/00
See application file for complete search history.

(56) References Cited

U.S. PATENT DOCUMENTS

| | | | |
|---|---|---|---|
| 2013/0065060 A1* | 3/2013 | Lee ........................ | B82Y 30/00 428/420 |
| 2015/0010709 A1* | 1/2015 | Beckford ............... | B05D 5/083 427/385.5 |
| 2015/0258506 A1* | 9/2015 | Mi ........................ | C01B 31/043 156/273.1 |
| 2016/0318100 A1* | 11/2016 | Kim ...................... | B22F 1/0018 |

FOREIGN PATENT DOCUMENTS

| | | | | |
|---|---|---|---|---|
| CN | 103127915 A | * | 6/2013 | .............. B01J 20/26 |
| CN | 104031297 A | * | 9/2014 | ............... C08K 9/04 |
| CN | 104098860 A | * | 10/2014 | ............. C08G 73/02 |

(Continued)

OTHER PUBLICATIONS

CN 103127915 A (Jun. 2013) Machine translation.*

(Continued)

*Primary Examiner* — Rip A Lee

(57) ABSTRACT

Disclosed is a method for fabricating a low friction and highly durable coating on a solid substrate. Also disclosed is a coating that increase durability and reduce friction of a substrate. The coating comprises at least one layer polydopamine and one layer of graphite. Dip coating is used to deposit said polydopamine layer on top of a substrate and then said graphite coating on top of said polydopamine layer.

9 Claims, 4 Drawing Sheets

(56) References Cited

FOREIGN PATENT DOCUMENTS

| CN | 104399090 A | * | 3/2015 | ............. A61K 49/00 |
|----|-------------|---|--------|--------------------------|
| CN | 106340399 A | * | 1/2017 | ............. H01G 11/32 |

OTHER PUBLICATIONS

Gu, R.; Xu, W.Z.; Charpentier, P.A. J. Polym. Sci., Part A: Polym. Chem. 2013, 51, 3941-3949.*
Guo, L.; Liu, Q.; Li, G.; Shi, J.; Liu, J.; Wang, T.; Jiang, G. Nanoscale 2012, 4, 5864-5867.*
Hwang et al. (KR 2013019232 A) Feb. 26, 2013; abstract.*
Beckford, S.; Zou, M. Applied Surface Science 2014, 292, 350-356.*
Sengupta, R., Bhattacharya, M., Bandyopadhyay, S., Bhowmick, A.K., "A review on the mechanical and electrical properties of graphite and modified graphite reinforced polymer composites," Progress in Polymer Science 36 (2011) 638-670.
Lee, H., Lee, N., Seo Y., Eom, J., and Lee, S.W., "Comparison of frictional forces on graphene and graphite," Nanotechnology 20 (2009) 325701 (6pp).
Beckford, S. and Zou, M. "Wear resistant PTFE thin film enabled by a polydopamine adhesive layer," Applied Surface Science 292 (2014): 350-356.
Carter, J.K., Friction and Wear of Polytetrafluoroethylene/Graphene Oxide Composite Thin Films. University of Arkansas, 2013.
Beckford, S., Cai, J., Fleming, R.A., and Zou, M., "The Effects of Graphite Filler on the Tribological Properties of Polydopamine/PTFE Coatings." Tribology Letters 64.3 (2016): 42.

* cited by examiner

HIGHLY DURABLE AND WELL-ADHERED GRAPHITE COATING

FIELD OF INVENTION

This invention relates generally to a method of depositing well-adhered solid lubricants with layered atomic structures on a substrate and more specifically relates to a method of depositing polydopamine (PDA) assisted graphite coating on a substrate to increase durability and reduce friction of the substrate.

BACKGROUND OF THE INVENTION

Traditionally, petroleum-based oils and greases have played a dominant role in applications requiring lubrication. However, with applications needing lubrication in extreme conditions, such as high temperature, high pressure, maintenance free systems, and low-emission systems, much emphasis has been placed on the development of effective solid lubricants that can be coated onto a solid surface.

Solid lubricants with layered atomic structures are of great interest because of their self-lubricating properties. Among these solid lubricants, graphite has particularly drawn great attention because it has low coefficient of friction (COF) and is high temperature resistant. However, graphite is hard to stick to a solid substrate such as stainless steel, which significantly limited its applications. The present invention enables graphite and other solid lubricants with layered atomic structures to strongly adhere to a solid substrate and such provide durability and low friction property to the substrate.

BRIEF SUMMARY OF THE INVENTION

The present invention enables a well-adhered graphite coating and other solid lubricants with layered atomic structures to be deposited on a solid substrate to increase durability and reduce friction of the substrate.

DETAILED DESCRIPTION OF THE PRESENT INVENTION

Figure 1:
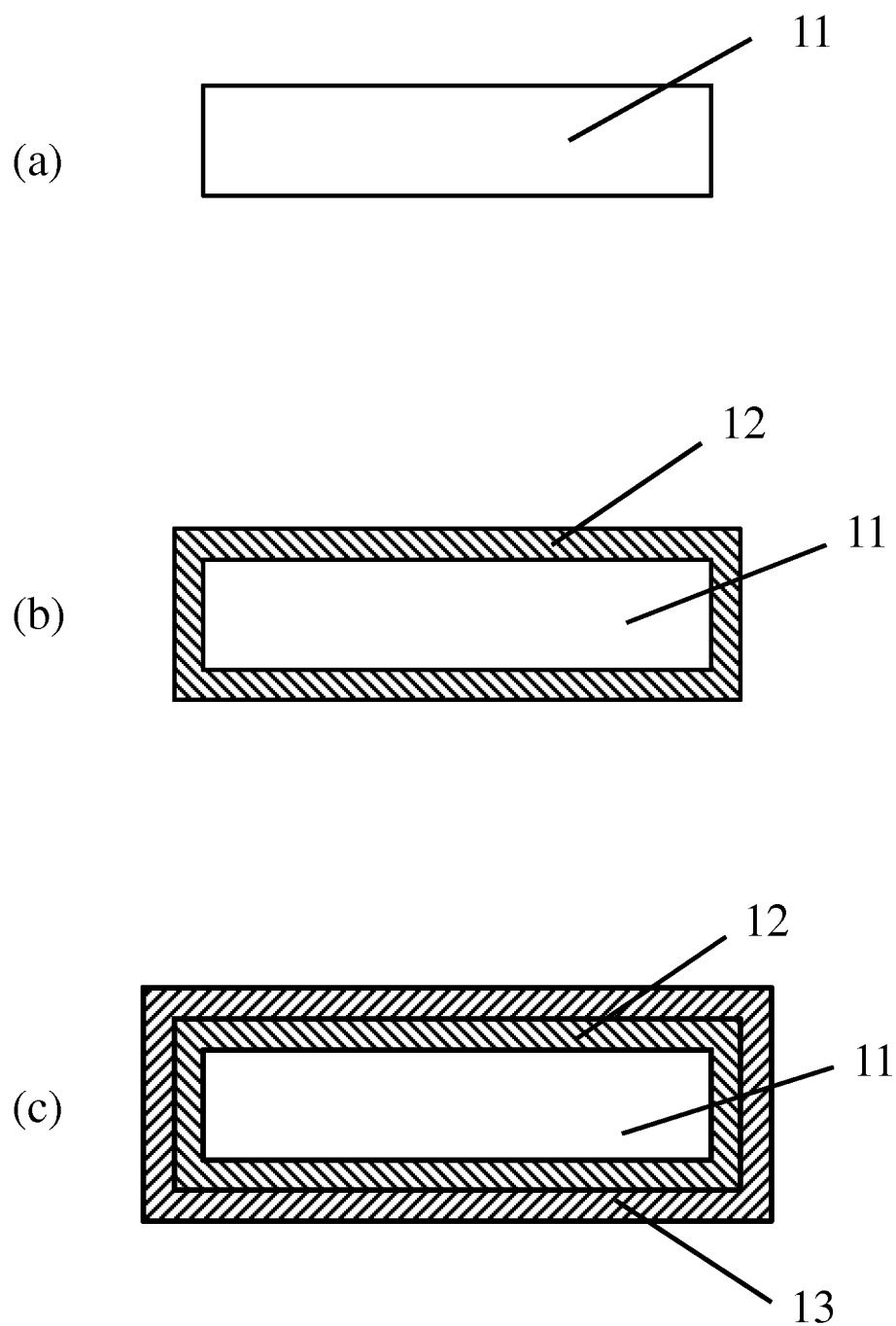
FIG. 1 are schematics of cross-sectional views of (a) a substrate, (b) a substrate coated with PDA coating, and (c) a substrate coated with PDA coating and then a graphite coating (not to scale).

Before the present invention is described in further detail, it should be understood that the invention is not limited to the particular embodiment to be described, and that the terms used in describing the particular embodiment are for the purpose of describing the particular embodiment only, and are not intended to be limiting.

The preferred embodiment of the present invention is a two-layer coating comprising of PDA under layer and graphite top layer. Both PDA and graphite layers can be either continuous layers or non-continuous layers.

The term "PDA" as used herein refers to polydopamine, noncovalent aggregates of dopamine and 5,6-dihydroxyindole, and any polydopamine composite in which polydopamine is the main component.

We have tested durability and friction of the coatings produced by five existing graphite containing products. In the following section, we will only compare the most durable coating produced by five existing graphite containing products to the PDA/graphite coating produced according to the present invention. In the document, the term "best commercial product" refers to the most durable coating produced by the existing graphite containing products, and "PDA/graphite coating" refers to PDA/graphite coating produced according to the present invention.

Without the intent to limit the scope of the invention, an exemplary method and its related results according to the embodiment of the present invention is given below.

Preferred Embodiment

In this preferred embodiment, six 5.0 cm by 2.5 cm rectangular substrates were cut from 0.03 inch-thick Corrosion Resistant stainless steel sheets (type 316, McMaster-CARR, USA) with Mirror-Like Finish. After cutting, the substrates were immersed in acetone, first in degassing bath for 5 minutes and then in an ultrasonic bath for 20 minutes. The substrates were then soaked in isopropyl alcohol in an ultrasonic bath for 5 minutes and rinsed in deionized (DI) water three times. After the cleaning process, the substrates were blown dry using a nitrogen gas blower.

One of the six substrates was then coated with DPA layer of thickness ranging between 50 and 200 nm using dip coating technique at room temperature. The use of five other substrates will be explained later. The PDA solution was produced by the following two steps. First, Trizma base (T1503, Sigma Aldrich, St. Louis, Mo.) was mixed with DI water to produce a 10 mM concentration of Tris buffer solution. Then dopamine hydrochloride (H8502, Sigma Aldrich, St. Louis, Mo.) was mixed into the Tris buffer solution at a concentration of 2 mg/mL to initialize the polymerization process. Trizma base and dopamine hydrochloride were combined to produce a PDA pH 8.5 solution.

Then a graphite layer of thickness about 2 µm was dip coated on the top of said PDA layer, forming a sample having a PDA/graphite coating on a stainless steel substrate. The graphite solution used to deposit graphite on the PDA layer was produced by diluting AMLUBE 235 graphite developed by AM Industries to 10% by wt. using DI water.

Detailed dip coating processes are as following: the stainless steel substrate 11 shown in FIG. 1(a) was first dipped into said PDA solution at an insertion and withdrawal speed of 10 mm/min and immersion duration of 24 hours to form a layer of thin coating 12 on the stainless steel substrate 11 as shown in FIG. 1(b). The PDA coated substrate shown in FIG. 1(b) was subsequently rinsed in DI water in an ultrasonic bath for 5 minutes and dried using a nitrogen blower. The PDA coated substrate was then dip coated in said graphite solution. The graphite coating 13 shown in FIG. 1(c) was deposited on the top of the PDA coating 12 at room temperature using a 10 mm/min dip coating insertion and withdrawal speed and immersion duration of 20 sec. The sample having PDA/graphite coating on the stainless steel substrate was then left in air for about 5 minutes until the coating was dry. After that, the sample was heated on a hot plate at 120° C. for 3 min and in a furnace at a temperature of 200° C. for 4 minutes. The total thickness of the PDA/graphite coating was about 2.2 µm.

Five different commercial graphite containing products were used to produce graphite coatings on the remaining five stainless steel substrates. The thickness of the five coatings varied from 15 to 90 μm, which is much thicker than the PDA/graphite coating produced according to the present invention.

To evaluate the durability and friction of the coatings, tribological testing was performed using an automatic friction abrasion analyzer (Triboster TS-501, Kyowa Interface Science Co., Ltd., Niiza-City, Japan) on said PDA/graphite coating and the coatings produced by using the five commercial graphite containing products. The friction abrasion analyzer functions in a linear reciprocating motion, measuring the friction force as the counterface slides across the surface. The counterface used was a 7 mm diameter chrome steel ball (SUJ-2, Kyowa Interface Science Co., Ltd., Niiza-City, Japan), and the test was performed under a 50 g normal load, 2.5 mm/s sliding speed, and 15 mm stroke length. The use of a small diameter chrome steel ball as a counterface results in a point contact between the ball and the sample, producing high contact pressures under a load of 350 g. The high contact pressure accelerated the wear process, allowing comparisons to be made between samples at reasonable testing durations. To maintain consistency, all tribological testing was performed by rubbing the samples in a direction orthogonal to the polishing lines of the stainless steel substrates.

Although the tribological performance of all five commercial coatings was tested, only the result from the most durable coating is presented here to compare to the PDA/graphite coating produced according to the present invention.

Figure 2:
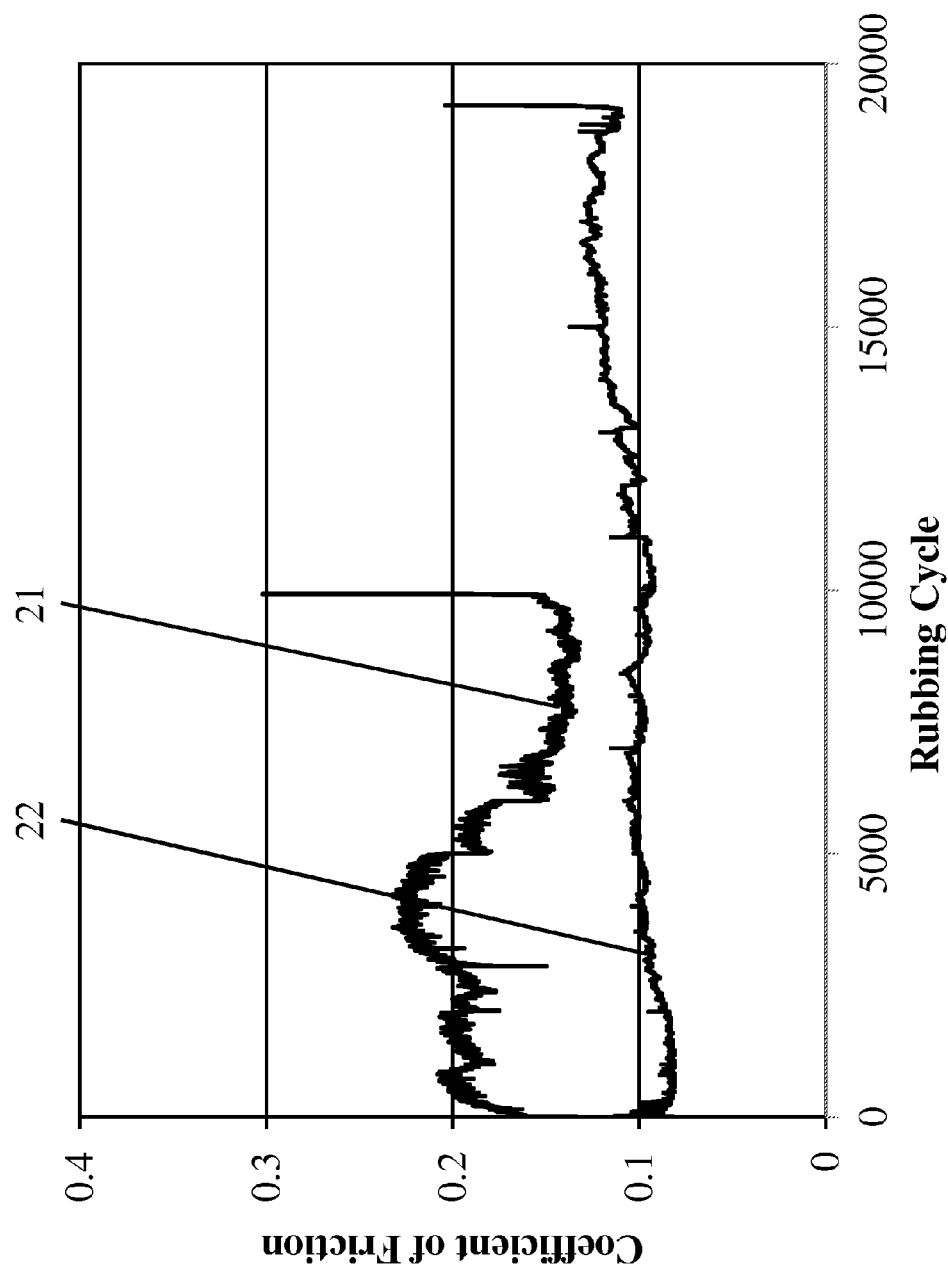
FIG. 2 shows dynamic COFs of graphite coatings vs. rubbing cycle.
Figure 3:
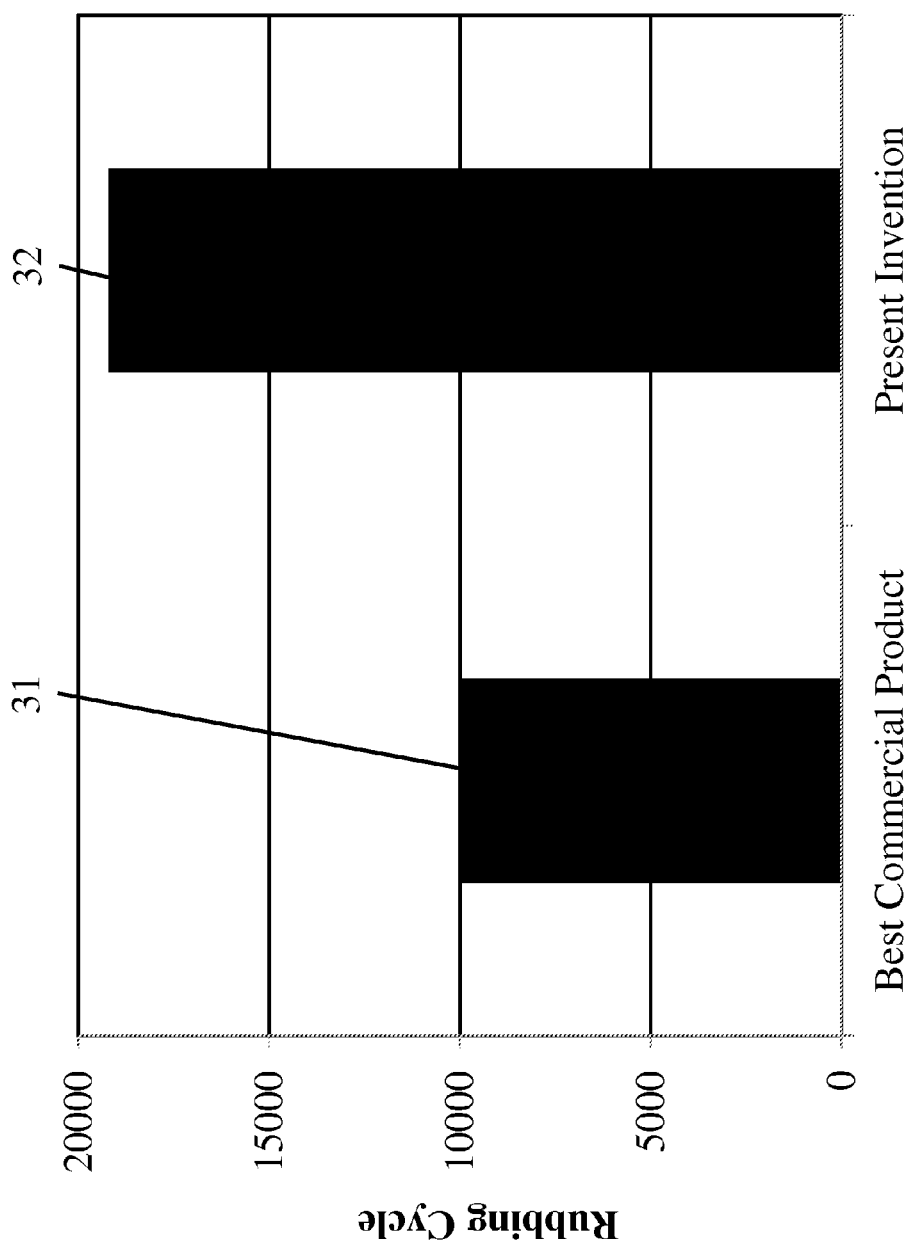
FIG. 3 shows the durability (the number of rubbing cycles before failure) of graphite coatings.
Figure 4:
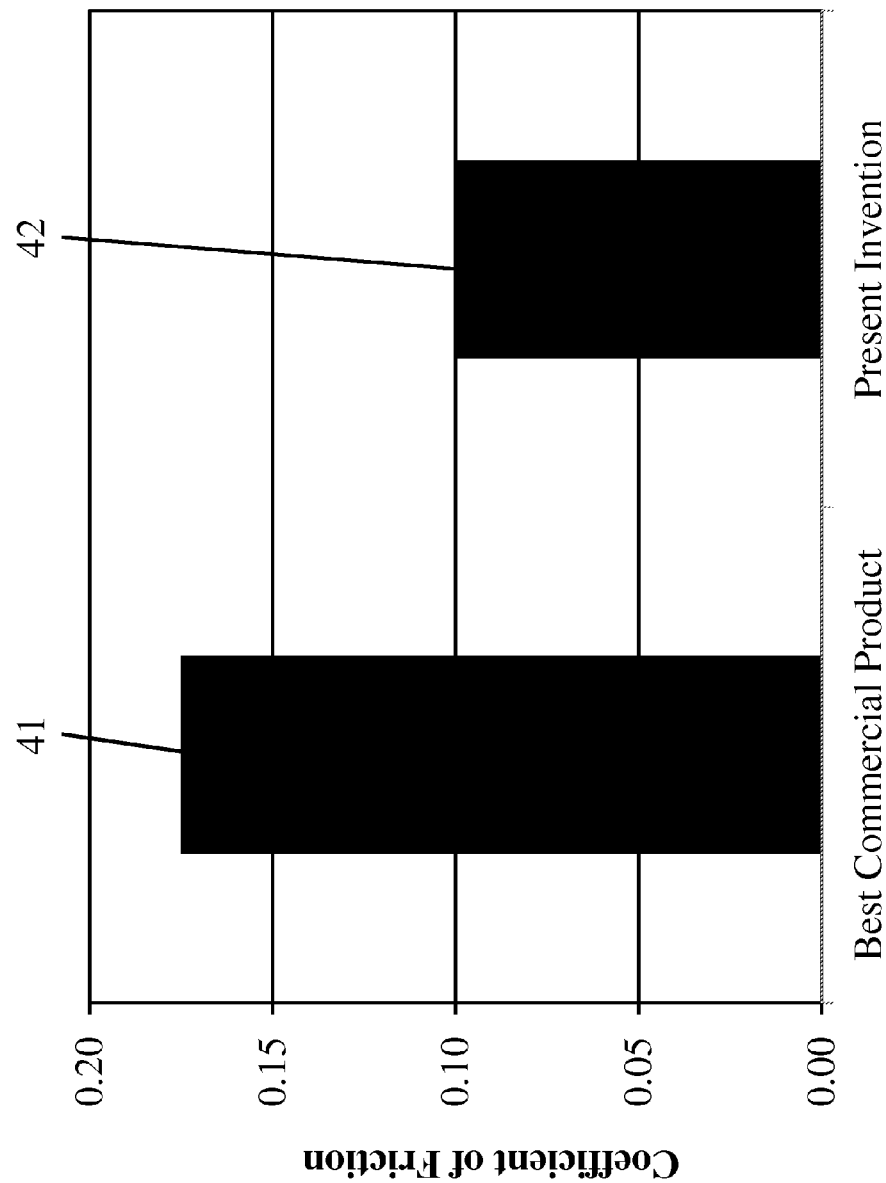
FIG. 4 shows COFs of graphite coatings.

FIG. 2 shows dynamic COF vs. rubbing cycle of the PDA/graphite coating and best commercial product. In FIG. 2, curve 21 is the testing result from the coating produced using the best commercial graphite, while curve 22 is the PDA/graphite coating produced according to the present invention. In FIG. 2, the sharp increase of COF at the end of each curve represents failure of the coating. FIG. 3 shows the durability (the number of rubbing cycles before failure) of the best commercial product and the PDA/graphite coating. In FIG. 3, bar 31 represents the durability of the best commercial product. The coating failed at about 9900 cycles. The bar 32 in FIG. 3 represents the durability of PDA/graphite coating produced according to the present invention. The coating failed at 19000 cycles. The test result shows that the durability of the PDA/graphite coating is 190% of the durability of the best commercial product. FIG. 4 shows average COF before failure of the best commercial product and PDA/graphite coating. In FIG. 4, bar 41 shows that the average COF of the best commercial product is about 0.175. Bar 42 in FIG. 4 shows the average COF of the PDA/graphite coating is about 0.1.

In the preferred embodiment, said PDA/graphite coating is produced on a stainless steel substrate. As an alternative, the substrate can be any other material.

In the preferred embodiment, graphite is deposited on top of the PDA layer as a solid lubricant. As an alternative, other solid lubricants with layered atomic structures, such as tungsten disulfide, or molybdenum disulfide, or the mix of the solid lubricants with layered atomic structures, can be used to produce lubricating coatings on top of the PDA layer.

In the preferred embodiment, dip coating is used to deposit both said PDA and graphite coatings on a stainless steel substrate. As an alternative, the PDA and graphite coatings can also be deposited on a substrate by soaking in solution, spray coating, roll coating, printing, spin coating process, or any combination thereof.

In the preferred embodiment, said PDA coating was dip coated at room temperature. As an alternative, said PDA coating can be dip coated at high temperatures to reduce PDA coating time.

In the preferred embodiment, the sample having PDA/graphite coating on a stainless steel substrate was heated at 120° C. for 3 min and then at 200° C. for 4 minutes after PDA/graphite coating. As an alternative, the heating process can be removed. As another alternative, the sample can be heated at other temperatures.

In the preferred embodiment, the coating has a stack structure having the graphite coating formed on the top of the PDA coating that is formed on a substrate. As an alternative, the stacked structure can comprise more than one layer of PDA and graphite producing multiple intercalated layers of the two materials.

The description of the preferred embodiment of the present invention is intended to be exemplary only and not limiting the full scope of the present invention. Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

What is claimed is:

1. A method for forming a durable and low friction coating on a substrate, comprising
   (a) depositing a polydopamine coating on the substrate surface; and
   (b) depositing solid lubricant with layered atomic structure coating on said polydopamine coating, thereby forming a stack structure having said solid lubricant with layered atomic structure coating formed on top of said polydopamine coating that is, in turn, formed on the substrate,
   wherein said solid lubricant with layered atomic structure is graphite, tungsten disulfide, molybdenum disulfide, or mixtures thereof.

2. The method of claim 1 further comprising heating said stack structure at temperatures higher than room temperature.

3. The method of claim 1, wherein said polydopamine coating is made of polydopamine, noncovalent aggregates of dopamine and 5,6-dihydroxyindole, or a polydopamine composite in which polydopamine is the main component.

4. A durable and low friction coating on a substrate comprising at least one layer of polydopamine and at least one layer of solid lubricant with layered atomic structure,
   wherein said solid lubricant with layered atomic structure is graphite, tungsten disulfide, molybdenum disulfide, or mixtures thereof.

5. The durable and low friction coating of claim 4, wherein said polydopamine layer is deposited on the substrate and said solid lubricant with layered atomic structure layer is deposited on top of said polydopamine layer.

6. The durable and low friction coating of claim 4, wherein said polydopamine coating is deposited by a dip coating, spray coating, spin coating, or roll coating process, soaking in solution, printing, or combinations thereof.

7. The durable and low friction coating of claim 4, wherein said graphite coating is deposited by a dip coating, spray coating, spin coating, or roll coating process, soaking in solution, printing, or combinations thereof.

8. The durable and low friction coating of claim 4, wherein said polydopamine layer is made of polydopamine, noncovalent aggregates of dopamine and 5,6-dihydroxyindole, or a polydopamine composite in which polydopamine is the main component.

9. The durable and low friction coating of claim 4, having a stacked structure wherein said stacked structure comprises more than one layer of polydopamine and graphite.

* * * * *